(12) United States Patent
Park et al.

(10) Patent No.: US 12,633,623 B2
(45) Date of Patent: May 19, 2026

(54) BATTERY CELL CONNECTION STRUCTURE AND METHOD

(71) Applicant: LG CHEM, LTD., Seoul (KR)

(72) Inventors: Hyeong Min Park, Daejeon (KR); Ju Hwan Baek, Daejeon (KR); Geon Tae Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1137 days.

(21) Appl. No.: 17/058,285

(22) PCT Filed: Oct. 15, 2019

(86) PCT No.: PCT/KR2019/013459
§ 371 (c)(1),
(2) Date: Nov. 24, 2020

(87) PCT Pub. No.: WO2020/080777
PCT Pub. Date: Apr. 23, 2020

(65) Prior Publication Data
US 2021/0367300 A1      Nov. 25, 2021

(30) Foreign Application Priority Data

Oct. 18, 2018      (KR) ........................ 10-2018-0124459

(51) Int. Cl.
*H01M 50/502*        (2021.01)
*H01M 50/204*        (2021.01)
(Continued)

(52) U.S. Cl.
CPC ....... *H01M 50/502* (2021.01); *H01M 50/204* (2021.01); *H01M 50/264* (2021.01); *H01M 50/291* (2021.01); *H01M 50/50* (2021.01)

(58) Field of Classification Search
CPC .. H01M 50/502; H01M 50/50; H01M 50/264; H01M 50/291; H01M 50/204;
(Continued)

(56) References Cited

U.S. PATENT DOCUMENTS

| | | | |
|---|---|---|---|
| 2011/0305942 A1 | 12/2011 | Park | |
| 2011/0308856 A1 | 12/2011 | Park | |

(Continued)

FOREIGN PATENT DOCUMENTS

| | | |
|---|---|---|
| CN | 102280648 A | 12/2011 |
| CN | 102903881 A | 1/2013 |

(Continued)

OTHER PUBLICATIONS

Machine Translation of KR 20180053152 A—cited in IDS filed on Nov. 24, 2020 (Year: 2018).*

(Continued)

*Primary Examiner* — Matthew T Martin
*Assistant Examiner* — Kevin Song
(74) *Attorney, Agent, or Firm* — Birch, Stewart, Kolasch & Birch, LLP

(57)        ABSTRACT

Discussed is a battery cell connection structure including frame and a connection member configured to connect a plurality of battery cells loaded in the frame to the frame, wherein the connection member includes a connection portion configured to be connected to the plurality of battery cells loaded in the frame and a coupling portion extending from the connection portion, the coupling portion being configured to be coupled to the flame, and wherein the coupling portion is provided with a plurality of coupling position indication portions arranged in a line in the direction in which the coupling portion extends, the plurality of coupling position indication portions being configured to
(Continued)

indicate a coupling position of the coupling portion at which the coupling portion is coupled to the frame.

10 Claims, 7 Drawing Sheets

(51) Int. Cl.
  *H01M 50/264*     (2021.01)
  *H01M 50/291*     (2021.01)
  *H01M 50/50*      (2021.01)
(58) Field of Classification Search
  CPC ............. H01M 50/262; H01M 50/503; H01M 50/517; H01M 50/202; Y02E 60/10
  See application file for complete search history.

(56)               References Cited

U.S. PATENT DOCUMENTS

| | | | |
|---|---|---|---|
| 2012/0141852 A1 | 6/2012 | Eberhard et al. | |
| 2012/0231320 A1* | 9/2012 | Heck ................... | H01M 50/522 |
| | | | 429/159 |
| 2013/0029540 A1 | 1/2013 | Tong et al. | |
| 2013/0224532 A1 | 8/2013 | Bengtsson et al. | |
| 2013/0230761 A1 | 9/2013 | Okutani et al. | |
| 2014/0234668 A1 | 8/2014 | Sweney et al. | |
| 2015/0086834 A1 | 3/2015 | Cho | |
| 2015/0295280 A1 | 10/2015 | Cho et al. | |
| 2017/0309869 A1* | 10/2017 | Kim .................... | H01M 50/121 |
| 2020/0014006 A1 | 1/2020 | Oliveira et al. | |

FOREIGN PATENT DOCUMENTS

| | | | | |
|---|---|---|---|---|
| JP | WO2012/073399 A1 | 5/2014 | | |
| JP | 2015-108531 A | 6/2015 | | |
| JP | 2015-198071 A | 11/2015 | | |
| JP | 2016-48634 A | 4/2016 | | |
| KR | 10-2011-0135184 A | 12/2011 | | |
| KR | 10-2015-0117920 A | 10/2015 | | |
| KR | 10-2015-0121039 A | 10/2015 | | |
| KR | 10-2017-0120258 A | 10/2017 | | |
| KR | 10-2018-0053152 A | 5/2018 | | |
| KR | 2018053152 A * | 5/2018 | ............ | H01M 2/106 |
| KR | 20180053152 A * | 5/2018 | ............ | H01M 2/202 |
| WO | WO 2017/169729 A1 | 10/2017 | | |
| WO | WO-2018158018 A1 * | 9/2018 | .......... | H01M 10/625 |

OTHER PUBLICATIONS

KR-2018053152-A Translation (Year: 2018).*
KR-20180053152-A Translation (Year: 2018).*
Extended European Search Report for European Application No. 19873161.4, dated Apr. 23, 2021.
International Search Report (PCT/ISA/210) issued in PCT/KR2019/013459 mailed on Jan. 22, 2020.

* cited by examiner

【FIG. 1】
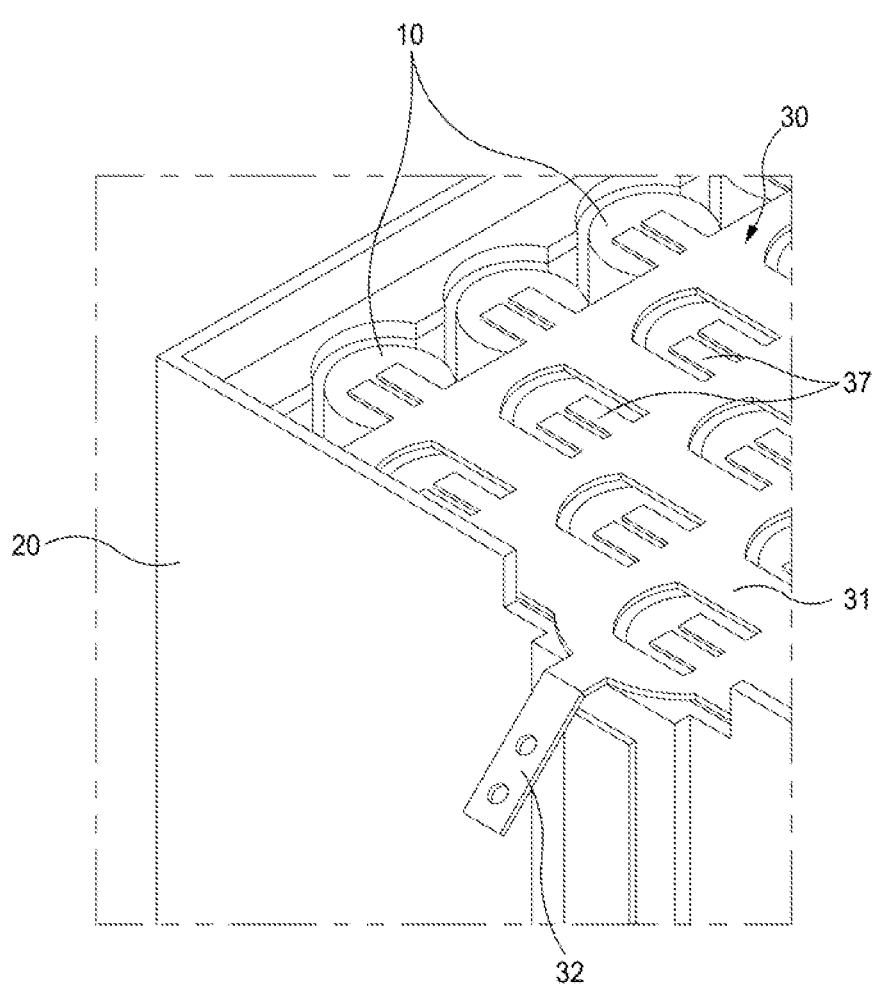

【FIG. 2】
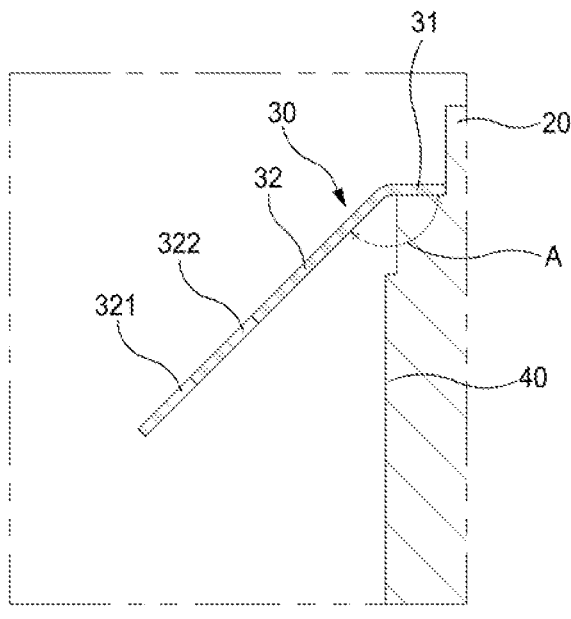
【FIG. 3】
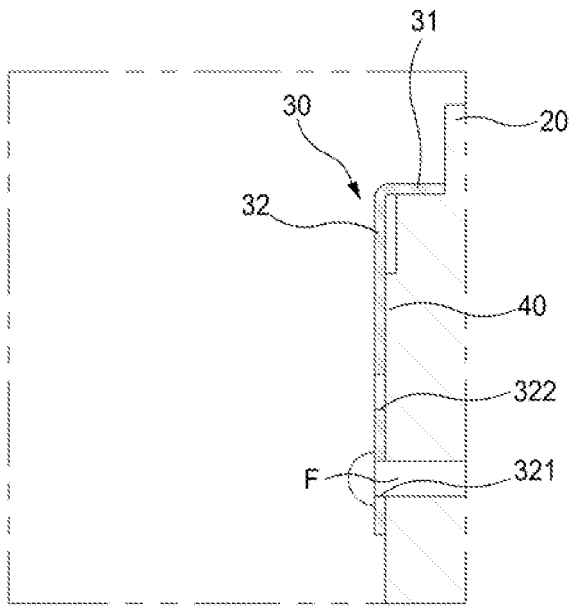

【FIG. 4】
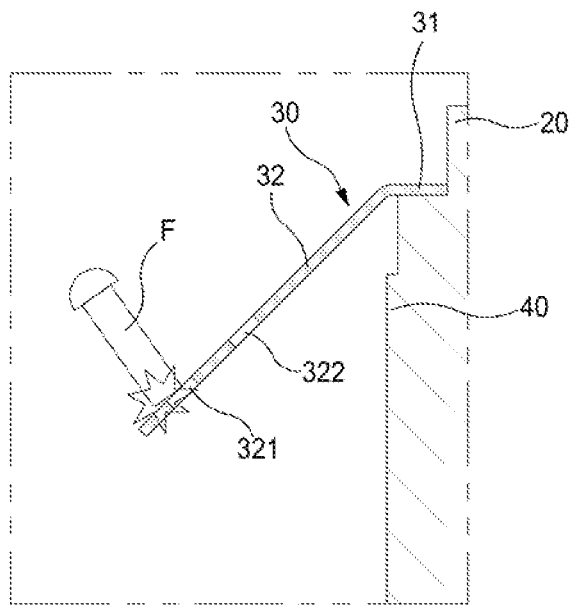
【FIG. 5】
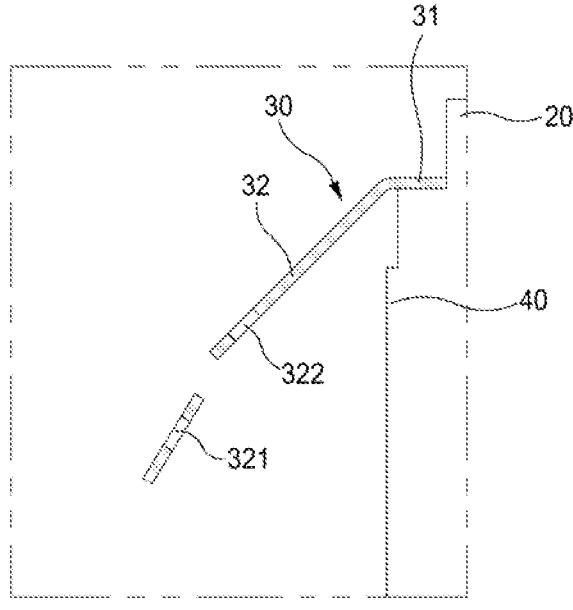

【FIG. 6】
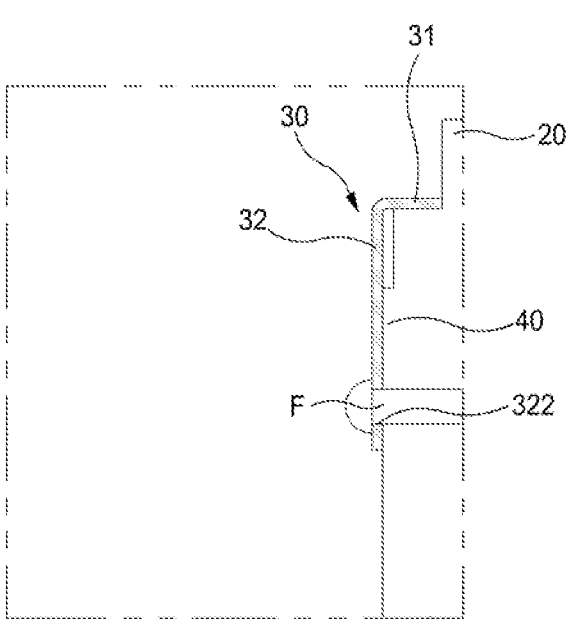

【FIG. 7】
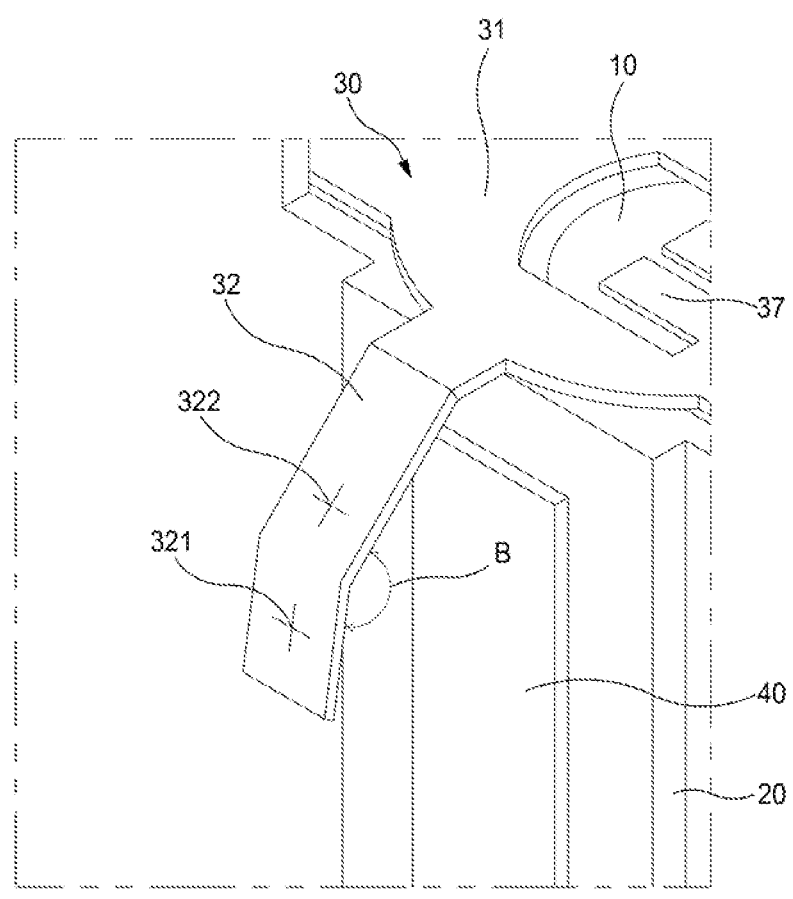

【FIG. 8】
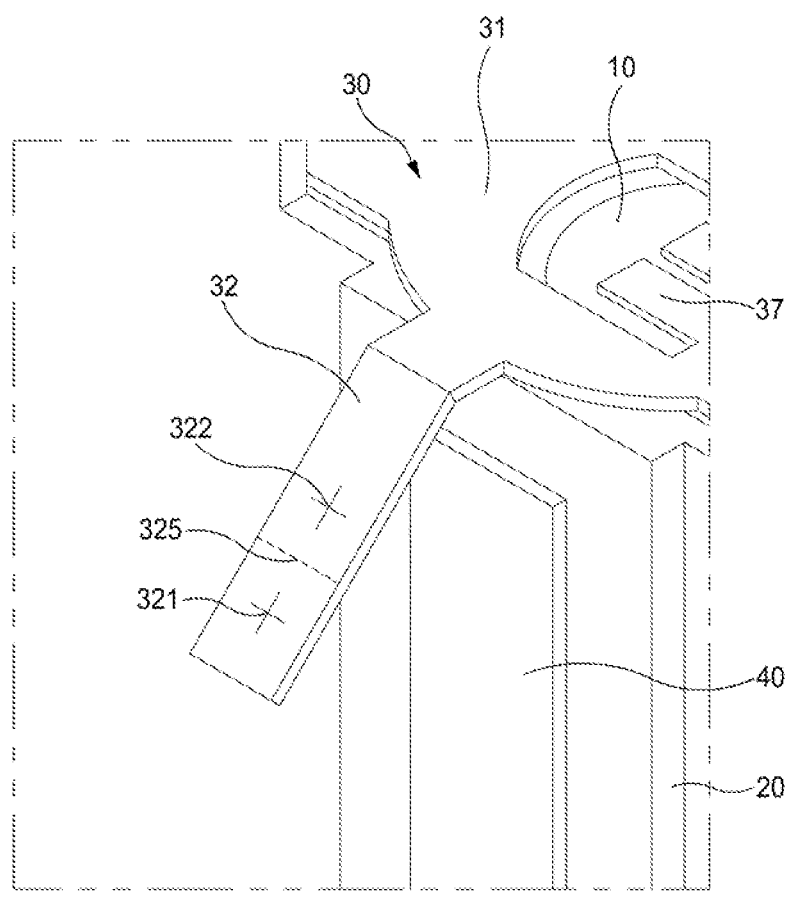

【FIG. 9】
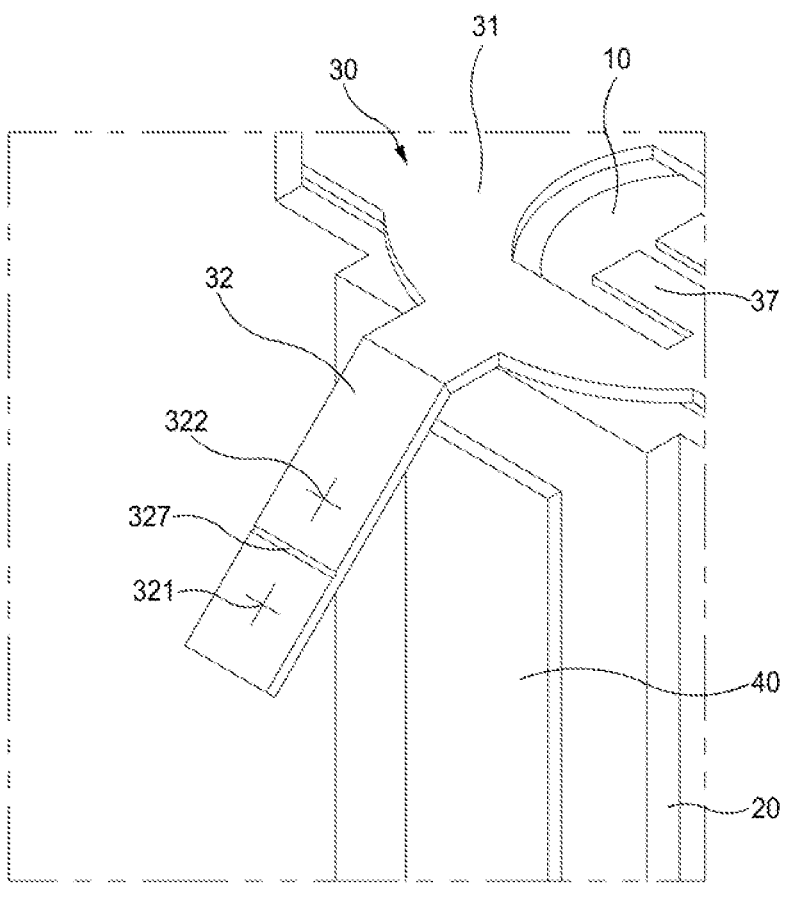

BATTERY CELL CONNECTION STRUCTURE AND METHOD

TECHNICAL FIELD

This application claims the benefit of priority to Korean Patent Application No. 2018-0124459 filed on Oct. 18, 2018, the disclosure of which is hereby incorporated by reference herein its entirety.

The present invention relates to a structure and method for connecting a battery cell to a frame.

BACKGROUND ART

In recent years, with an increase in the demand for portable electronic devices, such as laptop computers, smartphones, and tablet computers, research has been actively conducted on high-performance secondary batteries that are capable of being repeatedly charged and discharged.

In addition, secondary batteries have come to be widely used in middle- or large-sized devices, such as vehicles, robots, and satellites, as well as small-sized devices, such as portable electronic devices. In particular, as fossil fuels are being depleted and increasing attention is being paid to environmental pollution, research on hybrid vehicles and electric vehicles is being actively conducted. The most essential part of a hybrid vehicle or an electric vehicle is a battery pack configured to supply electric power to a motor.

A plurality of battery cells is densely provided in a battery module. The battery module includes a frame, in which the plurality of battery cells are loaded, and a connection member connected to the plurality of battery cells, the connection member being coupled to the frame. The connection member is generally fastened to the frame using a rivet.

A riveting process has advantages in that the riveting process is performed within a short processing time and in that the force of fastening between the connection member and the frame is increased. However, it is difficult to separate the connection member and the frame, coupled to each other through the riveting process, from each other. Also, in the case in which a separate tool is used between the connection member and the frame, it is difficult to perform riveting due to interference with the separate tool. Consequently, in the case in which the process of coupling the connection member to the frame fails, i.e. in the case in which a portion of the connection member is damaged during the process of coupling the connection member to the frame, the battery module must be completely disassembled or discarded.

DISCLOSURE

Technical Problem

The present invention has been made in view of the above problems, and it is an object of the present invention to provide a battery cell connection structure and method that are capable of coupling a connection member to a frame without completely disassembling a battery module even in the case in which the process of coupling the connection member to the frame fails.

Technical Solution

In accordance with an aspect of the present invention, the above and other objects can be accomplished by the provision of a battery cell connection structure including a connection member configured to connect a plurality of battery cells loaded in a frame to the frame, wherein the connection member includes a connection portion configured to be connected to the plurality of battery cells loaded in the frame and a coupling portion extending from the connection portion, the coupling portion being configured to be coupled to the frame, and the coupling portion is provided with a plurality of coupling position indication portions arranged in a line in the direction in which the coupling portion extends, the plurality of coupling position indication portions being configured to indicate a coupling position of the coupling portion at which the coupling portion is coupled to the frame.

The coupling portion may be inclined at a predetermined angle relative to the connection portion.

Each of the coupling position indication portions may be configured as any one of a concave recess, a protrusion, and a mark.

The coupling portion may be coupled to the frame using a fastening member, and each of the coupling position indication portions may be a through-hole, through which the fastening member is inserted.

A coupling position indication portion located at the outermost end of the coupling portion in the direction in which the coupling portion extends, among the plurality of coupling position indication portions, may be coupled to the frame.

At least a pair of coupling position indication portions, among the plurality of coupling position indication portions, may be formed so as to have a predetermined angle therebetween.

A cutting mark may be made between a pair of adjacent coupling position indication portions, among the plurality of coupling position indication portions.

A cutting groove may be formed between a pair of adjacent coupling position indication portions, among the plurality of coupling position indication portions.

Each of the coupling position indication portions may be coupled to the frame by any one of bolting, riveting, and welding.

In accordance with another aspect of the present invention, there is provided a battery cell connection method using a battery cell connection structure including a connection member configured to connect a plurality of battery cells loaded in a frame to the frame, wherein the connection member includes a connection portion configured to be connected to the plurality of battery cells loaded in the frame and a coupling portion extending from the connection portion, the coupling portion being configured to be coupled to the frame, and the coupling portion is provided with a plurality of coupling position indication portions arranged in a line in the direction in which the coupling portion extends, the plurality of coupling position indication portions being configured to indicate a coupling position of the coupling portion at which the coupling portion is coupled to the frame, wherein the battery cell connection method includes (a) coupling a first coupling position indication portion, located at the outermost end of the coupling portion in the direction in which the coupling portion extends, among the plurality of coupling position indication portions, to the frame, (b) in the case in which a process of coupling the first coupling position indication portion to the frame fails, removing the first coupling position indication portion from the coupling portion, and (c) coupling a second coupling position indication portion, adjacent to the first coupling position indication portion, to the frame.

Step (b) may be performed before or after step (c).

In accordance with a further aspect of the present invention, there is provided a battery module comprising a battery cell connected using the battery cell connection structure or the battery cell connection method.

BRIEF DESCRIPTION OF DRAWINGS

FIG. 1 is a perspective view schematically showing a battery cell connection structure according to an embodiment of the present invention and a battery module.

FIG. 2 is a sectional view schematically showing the battery cell connection structure according to the embodiment of the present invention.

FIGS. 3 to 6 are sectional views schematically showing the operation process of the battery cell connection structure according to the embodiment of the present invention.

FIG. 7 is a sectional view schematically showing another example of the battery cell connection structure according to the embodiment of the present invention.

FIG. 8 is a sectional view schematically showing another example of the battery cell connection structure according to the embodiment of the present invention.

FIG. 9 is a sectional view schematically showing a further example of the battery cell connection structure according to the embodiment of the present invention.

BEST MODE

Hereinafter, a battery cell connection structure and method according to embodiments of the present invention will be described with reference to the accompanying drawings.

As shown in FIG. 1, a battery module, to which a battery cell connection structure according to an embodiment of the present invention is applied, includes a plurality of battery cells 10 and a frame 20 in which the plurality of battery cells 10 are loaded.

The battery cell connection structure according to the embodiment of the present invention serves to connect the plurality of battery cells 10, loaded in the frame 20, to the frame 20. The cell connection structure may include a connection member 30, which is connected to the plurality of battery cells 10 and which is coupled to the frame 20, and a fixing portion 40, which is provided at the frame 20 and to which the connection member 30 is fixed.

The fixing portion 40, which is the portion to which the connection member 30 is coupled, may be integrally formed with the frame, or may be manufactured separately from the frame 20 and may then be attached to the frame 20 by bolting, riveting, welding, etc.

The connection member 30 serves to electrically connect the plurality of battery cells 10 to each other. To this end, the connection member 30 may include terminal portions 37 connected to electrodes of the plurality of battery cells 10.

The connection member 30 may include a connection portion 31, which is connected to the plurality of battery cells 10, and a coupling portion 32 extending from the connection portion 31, the coupling portion 32 being coupled to the frame 20. The terminal portions 37, which are electrically connected to the plurality of battery cells 10, may be provided at the connection portion 31.

The coupling portion 32 is fixed to the fixing portion 40 of the frame 20. For example, the coupling portion 32 may be fixed to the fixing portion 40 of the frame 20 by any one of bolting, riveting, and welding.

As shown in FIG. 2, the coupling portion 32 may be formed so as to be inclined at a predetermined angle A relative to the connection portion 31. The coupling portion 32 may be formed so as to be inclined at an angle of about 90 degrees relative to the connection portion 31. Consequently, the coupling portion 32 may be formed so as to be inclined at an angle of about 45 degrees relative to the fixing portion 40 of the frame 20. Since the coupling portion 32 is formed so as to be inclined at the predetermined angle A relative to the connection portion 31, when the coupling portion 32 is fastened to the fixing portion 40 using a fastening member F, such as a rivet or a bolt, (see FIG. 3, 4, or 6), mechanical interference between the fastening member F or a tool used to fasten the fastening member F and the frame 20 or the fixing portion 40 may be prevented.

The coupling portion 32 may be provided with a plurality of coupling position indication portions 321 and 322, which are arranged in a line in the direction in which the coupling portion 32 extends and which indicate the coupling position of the coupling portion 32 at which the coupling portion 32 is coupled to the fixing portion 40 of the frame 20.

The plurality of coupling position indication portions 321 and 322 serve to guide the position at which the fastening member F is coupled to the coupling portion 32 when a worker couples the coupling portion 32 to the fixing portion 40 of the frame 20 using the fastening member F. In another example, the plurality of coupling position indication portions 321 and 322 serve to guide the position at which welding is to be performed when the worker couples the coupling portion 32 to the fixing portion 40 of the frame 20 using a welding machine.

In the drawings, the coupling portion 32 is shown as having therein two coupling position indication portions 321 and 322. However, the present invention is not limited thereto. The coupling portion 32 may be provided with three or more coupling position indication portions 321 and 322.

For example, as shown in FIGS. 1 to 6, each of the plurality of coupling position indication portions 321 and 322 may be formed in the shape of a hole, through which the fastening member F is inserted. Since each of the plurality of coupling position indication portions 321 and 322 is formed in the shape of a hole, the fastening member F may be inserted through the hole, whereby the coupling portion 32 may be easily coupled to the fixing portion 40 of the frame 20.

In another example, as shown in FIGS. 7 to 9, each of the plurality of coupling position indication portions 321 and 322 may be configured as a predetermined mark. However, each of the plurality of coupling position indication portions 321 and 322 may have any one of various shapes, as long as the plurality of coupling position indication portions 321 and 322 are capable of guiding the position at which the fastening member F is to be fastened or welded. For example, each of the plurality of coupling position indication portions 321 and 322 may be configured as any one of a concave recess, a through-hole, a protrusion, and a mark.

As shown in FIGS. 2 and 3, the coupling position indication portion 321 that is located at the outermost end of the coupling portion 32 in the direction in which the coupling portion 32 extends, among the plurality of coupling position indication portions 321 and 322, may be fixed to the fixing portion 40 of the frame 20.

As shown in FIG. 7, the plurality of coupling position indication portions 321 and 322 may be formed so as to have a predetermined angle B (an angle greater than 0 degrees) therebetween. In the case in which three or more coupling position indication portions 321 and 322 are provided, at least a pair of coupling position indication portions 321 and 322, among the three or more coupling position indication portions 321 and 322, may be formed so as to have the predetermined angle B therebetween. In the case in which the pair of coupling position indication portions 321 and 322 have the predetermined angle B therebetween, when the coupling position indication portion 321 that is located at the outermost end of the coupling portion 32 in the direction in which the coupling portion 32 extends, among the plurality of coupling position indication portions 321 and 322, is coupled to the fixing portion 40 of the frame 20, it is possible to prevent the other coupling position indication portion 322 from impeding the process in which the coupling position indication portion 321 located at the outermost end is coupled to the fixing portion 40 of the frame 20.

Meanwhile, as shown in FIG. 4, the process of coupling the coupling position indication portion 321 (the first coupling position indication portion), which is located at the outermost end, to the fixing portion 40 of the frame 20 may fail due to damage to the coupling portion 32 caused by a collision between the fastening member F and the coupling portion 32, etc. during the process of coupling the coupling position indication portion 321 (the first coupling position indication portion), which is located at the outermost end, to the fixing portion 40 of the frame 20.

In this case, as shown in FIG. 5, the coupling position indication portion 321 (the first coupling position indication portion) that is located at the outermost end may be removed from the coupling portion 32 by cutting.

Subsequently, as shown in FIG. 6, the coupling position indication portion 322 (the second coupling position indication portion) that is located at the outermost end of the coupling portion 32 after the removal process described above may be coupled to the fixing portion 40 of the frame 20.

Meanwhile, FIGS. 5 and 6 show that the process of removing the coupling position indication portion 321 (the first coupling position indication portion) from the coupling portion 32 by cutting is performed and then the process of coupling the coupling position indication portion 322 (the second coupling position indication portion) to the fixing portion 40 of the frame 20 is performed. However, the present invention is not limited thereto. For example, the process of coupling the coupling position indication portion 322 (the second coupling position indication portion) to the fixing portion 40 of the frame 20 may be performed, and then the process of removing the coupling position indication portion 321 (the first coupling position indication portion), which is defective, from the coupling portion 32 by cutting may be performed.

In the battery cell connection structure and method according to the embodiments of the present invention described above, even in the case in which the process of coupling the outermost end (the first coupling position indication portion 321) of the coupling portion 32 of the connection member 30 to the frame 20 fails, the outermost end (the first coupling position indication portion 321) of the coupling portion 32 may be removed by cutting, and then a newly formed outermost end (the second coupling position indication portion 322) of the coupling portion 32 may be coupled to the frame 20. Even in the case in which the process of coupling the connection member 30 to the frame 20 fails, therefore, the connection member 30 may be coupled to the frame 20 without completely disassembling the battery module.

In the case in which the process of coupling the outermost end (the first coupling position indication portion 321) of the coupling portion 32 of the connection member 30 to the frame 20 fails, as shown in FIG. 8, a cutting mark 325 is preferably provided between the plurality of coupling position indication portions 321 and 322 such that the worker can easily check the position at which the outermost end (the first coupling position indication portion 321) is to be cut. In the case in which three or more coupling position indication portions 321 and 322 are provided at the coupling portion 32, the cutting mark 325 may be made between a pair of adjacent coupling position indication portions 321 and 322. Since the cutting mark 325 is made between the pair of adjacent coupling position indication portions 321 and 322, as described above, the worker may operate a cutting tool along the cutting mark 325 while checking the cutting mark 325 at the time of cutting the outermost end (the first coupling position indication portion 321), whereby it is possible to accurately remove the outermost end (the first coupling position indication portion 321) by cutting.

In the case in which the process of coupling the outermost end (the first coupling position indication portion 321) of the coupling portion 32 of the connection member 30 to the frame 20 fails, as shown in FIG. 9, a cutting groove 327 is preferably formed between the plurality of coupling position indication portions 321 and 322 such that the worker can easily cut the portion from which the outermost end (the first coupling position indication portion 321) is to be cut in order to remove the same. In the case in which three or more coupling position indication portions 321 and 322 are provided at the coupling portion 32, the cutting groove 327 may be formed between a pair of adjacent coupling position indication portions 321 and 322. Since the cutting groove 327 is formed between the pair of adjacent coupling position indication portions 321 and 322, as described above, the outermost end (the first coupling position indication portion 321) may be easily cut along the cutting groove 327 when the worker cuts the outermost end (the first coupling position indication portion 321).

Although the preferred embodiments of the present invention have been described by way of illustration, the scope of the present invention is not limited to the specific embodiments described herein, and the present invention can be appropriately modified within the category described in the claims.

DESCRIPTION OF REFERENCE NUMERALS

10: Battery cell
20: Frame
30: Connection member
31: Connection portion
32: Coupling portion
40: Fixing portion

INDUSTRIAL APPLICABILITY

In the battery cell connection structure and method according to the embodiments of the present invention, even in the case in which the process of coupling the outermost end (the first coupling position indication portion) of the coupling portion of the connection member, which connects the plurality of battery cells, to the frame fails, the outermost end (the first coupling position indication portion) of the coupling portion may be removed by cutting, and then a newly formed outermost end (the second coupling position indication portion) of the coupling portion may be coupled to the frame. Even in the case in which the process of coupling the connection member to the frame fails, therefore, the connection member may be coupled to the frame without completely disassembling a battery module.

The invention claimed is:

1. A battery cell connection structure comprising:

a connection member configured to connect a plurality of battery cells loaded in a frame to the frame, wherein the connection member comprises:

a connection portion configured to be connected to the plurality of battery cells loaded in the frame; and a coupling portion extending from the connection portion, the coupling portion being configured to be coupled to the frame, the coupling portion further having an attached end and a free end, and the coupling portion being attached to the connection portion at the attached end and extending from the connection portion via the attached end, wherein the coupling portion is provided with a plurality of coupling position indication portions between the attached end and the free end, the plurality of coupling position indication portions being arranged in a line in a direction in which the coupling portion extends, the plurality of coupling position indication portions being configured to indicate a coupling position of the coupling portion at which the coupling portion is coupled to the frame, wherein the coupling portion is inclined at a first predetermined angle relative to the connection portion prior to being coupled to the frame, so that the coupling portion is not perpendicular to the connection portion, wherein a cutting mark is made between a pair of adjacent coupling position indication portions that are located between the attached end and the free end of the coupling portion, among the plurality of coupling position indication portions, and wherein the cutting mark is implemented as cutting groove having a depth to ease cutting of the free end.

2. The battery cell connection structure according to claim 1, wherein each of the coupling position indication portions is configured as any one of a concave recess, a protrusion, and a mark.

3. The battery cell connection structure according to claim 1, wherein the coupling portion is coupled to the frame using a fastening member, and wherein each of the coupling position indication portions is a through-hole, through which the fastening member is inserted.

4. The battery cell connection structure according to claim 1, wherein a coupling position indication portion located at an outermost end of the coupling portion in the direction in which the coupling portion extends, among the plurality of coupling position indication portions, is coupled to the frame.

5. The battery cell connection structure according to claim 1, wherein at least a pair of coupling position indication portions, among the plurality of coupling position indication portions, are formed so as to have a second predetermined angle therebetween.

6. The battery cell connection structure according to claim 1, wherein a cutting groove is formed between a pair of adjacent coupling position indication portions, among the plurality of coupling position indication portions.

7. The battery cell connection structure according to claim 1, wherein each of the coupling position indication portions is coupled to the frame by any one of bolting, riveting, and welding.

8. A battery module comprising the plurality of battery cells connected using the battery cell connection structure according to claim 1.

9. The battery cell connection structure according to claim 1, wherein the cutting mark is provided perpendicularly to the direction in which the coupling portion extends.

10. The battery cell connection structure according to claim 1, wherein the connection portion includes a first extension including a curved edge and extending from the connection portion, and a second extension connected to the first extension and extending from the first extension, and wherein the attached end of the coupling portion is attached to the second extension of the connection portion.

* * * * *